United States Patent
Brunello et al.

(10) Patent No.: US 9,745,878 B2
(45) Date of Patent: Aug. 29, 2017

(54) METHOD AND APPARATUS FOR REMOVAL OF PARTICULATE MATERIAL FROM REFINERY PROCESSES AND POWER GENERATION SYSTEM

(71) Applicant: FOSBEL, INC., Brook Park, OH (US)

(72) Inventors: Paolo Brunello, Brook Park, OH (US); Naiping Zhu, Strongsville, OH (US); James Tyler, Jamestown, PA (US)

(73) Assignee: FOSBEL, INC., Brook Park, OH (US)

( * ) Notice: Subject to any disclaimer, the term of this patent is extended or adjusted under 35 U.S.C. 154(b) by 169 days.

(21) Appl. No.: 14/608,604

(22) Filed: Jan. 29, 2015

(65) Prior Publication Data

US 2015/0211403 A1    Jul. 30, 2015

(30) Foreign Application Priority Data

Jan. 30, 2014   (GB) .................................. 1401604.2

(51) Int. Cl.
| | | |
|---|---|---|
| *B08B 3/04* | (2006.01) | |
| *F01N 3/20* | (2006.01) | |
| *B08B 5/04* | (2006.01) | |
| *F01N 3/023* | (2006.01) | |

(52) U.S. Cl.
CPC .............. *F01N 3/2066* (2013.01); *B08B 5/04* (2013.01); *F01N 3/0237* (2013.01); *F01N 2260/04* (2013.01); *F01N 2450/10* (2013.01); *Y02T 10/24* (2013.01)

(58) Field of Classification Search
CPC .. F01N 3/2066; F01N 3/0237; F01N 2260/04; F01N 2450/10; Y02T 10/24
USPC ..................... 134/104.2; 15/347, 354, 415.1
See application file for complete search history.

(56) References Cited

U.S. PATENT DOCUMENTS

| | | | |
|---|---|---|---|
| 6,571,420 B1 | 6/2003 | Healy et al. | |
| 2008/0035056 A1* | 2/2008 | Okubo | C23C 16/4417 118/716 |
| 2010/0205770 A1 | 8/2010 | Hozumi et al. | |
| 2011/0232688 A1 | 9/2011 | Karjunen | |

OTHER PUBLICATIONS

Search Report for UK 1401604.2, dated Jul. 31, 2014, 3 pages.

* cited by examiner

*Primary Examiner* — Eric Golightly
(74) *Attorney, Agent, or Firm* — Nixon & Vanderhye P.C.

(57) ABSTRACT

Apparatus and methods are provided whereby a component can be cleaned while the furnace is operational. Additionally, particulates that have accumulated on the component can be collected and retained. The apparatus may include a portable frame, a tubular lance supported by the frame and having a nozzle at a distal end thereof, and a suction generator operatively connected to a proximal end of the lance to generate a suction at the nozzle. Manipulation of the lance to move the nozzle across a component allows accumulated particulates to be removed therefrom through the lance.

26 Claims, 10 Drawing Sheets

METHOD AND APPARATUS FOR REMOVAL OF PARTICULATE MATERIAL FROM REFINERY PROCESSES AND POWER GENERATION SYSTEM

PRIORITY CLAIM

This application is based on and claims priority benefits from UK Patent Application No. 1401604.2 filed on Jan. 30, 2014, the entire content of which is expressly incorporated hereinto by reference.

FIELD

The present invention relates to cleaning of particulate material from refinery processes or power generation systems, including, but not limited to selective catalyst reduction ("SCR") catalysts, or components of an SCR system, or convection sections of refinery processes or a power generation system.

BACKGROUND

SCR systems are employed to remove Nitrogen Oxides (NOx) from spent flue gas. Nitrogen Oxides pose pollutions problems, whereas the NOx can react in the atmosphere with water vapor to produce to acid rain, or react with sunlight to produce ozone. NOx forms during combustion of fuel to heat furnaces, including but not limited to, hydrogen reformers, vacuum heaters, platformers, and other process heaters. NOx can form in three ways during combustion: Thermal, Fuel, and Prompt NOx.

The purpose of a SCR system is to convert the Nitrogen Oxides into diatomic Nitrogen (N2). The system uses liquid ammonia and a porous catalyst to convert the NOx. The ammonia is injected with air into the flue gas at a controlled ratio, and the Nitrogen oxides react with the ammonia and oxygen to form diatomic Nitrogen and water. The catalyst increases the conversion rate to over 90%. The Nitrogen and water can then be safely released into the atmosphere.

The interior of a furnace is lined with refractory ceramic fiber (RCF), insulating refractory brick, or a combination of the two. The RCF is composed of amorphous silica, that when subjected to elevated temperatures, such as in a platformer, will devitrify into crystalline silica and other components. Due to the gas velocity in the furnace, the crystalline silica is picked up in the gas flow and carried downstream. Likewise, the gas velocity and water vapor can act as an abrasive to the insulating refractory, and by a process known as silica migration, particulates from the insulating refractory can also be gathered and carried. Also, during combustion of fuel, in particular, oil, particulates can be generated and also carried downstream in a process known as oil dusting, for example. These particles can be deposited on the surface of the catalyst and contaminate the generally porous surface of a catalyst, or on heat transfer vanes of a convection section of a furnace. These cannot only reduce the effectiveness of the catalyst, but can also damage or poison the catalyst, leading to reduced performance. In the case of heat transfer vanes, the particulates act as insulators; this contamination thus reduces the heat transfer efficiency of the unit.

In order to overcome such issues, various ways of cleaning the contaminated units have been employed. One known method involves use of a sonic horn, to generate sound waves to dislodge particulates from the contaminated unit, which are then expelled with the flue gas. However, these particles may also become lodged in the channels of the catalyst, or fall to the bottom of the unit and collect. Another method involves blasting, typically with dry ice, which as it sublimes in the region of the particulates causes them to be dislodged from the contaminated unit.

SUMMARY

The embodiments disclosed herein seek to overcome or ameliorate at least one of the problems of the prior art or provide a useful alternative. Generally, methods and apparatus are provided whereby a component can be cleaned while the furnace is operational, or "on-line". Additionally, particulates that have accumulated on the component can be collected and retained, whereas previously, these would have been exhausted into the atmosphere, causing pollution.

According to some embodiments, an apparatus for removing accumulated particulates from a component will comprise a portable frame, a tubular lance supported by the frame and having a nozzle at a distal end thereof, and a suction generator operatively connected to a proximal end of the lance to generate a suction at the nozzle, wherein manipulation of the lance to move the nozzle across a component allows accumulated particulates to be removed therefrom through the lance. The nozzle may be comprised of graphite. According to some embodiments, the distal end of the lance may be at substantially a right angle relative to a longitudinal axis thereof.

The suction generator may be a static venturi device having inlet and outlet ends for passage therethrough of a flow of pressurized fluid, and a suction port, and wherein the apparatus comprises a flexible hose connecting the proximal end of the lance to the suction port of the venturi device. Other suction generators, e.g., vacuum pumps, may however be satisfactorily employed. According to those embodiments wherein the suction generator is a venturi device, the device will include inlet and outlet ends for passage therethrough of a flow of pressurized fluid, and a suction port. A flexible hose may thus be provided to connect the proximal end of the lance to the suction port of the venturi device. A filter assembly having an inlet end may be fluid-connected to the outlet end of the venturi device. According to such embodiments, therefore, the filter assembly will thereby receive a flow of pressurized fluid with entrained particulates from the outlet end of the venturi device and discharge a substantially particulate-free pressurized fluid flow through the discharge end of the filter assembly.

The frame may comprise a guide collar assembly having a tubular supporting collar surrounding the lance. The guide collar assembly according to some embodiments may include a support cradle, wherein the supporting collar is movably connected to the support cradle by a connection pin. Certain embodiments of the frame will be comprised of a separated pair of upright supports, and a gantry beam attached to and spanning the upright supports. The pair of upright supports may be height adjustable. A trolley may be movably coupled to the gantry beam such that a counterbalance device will interconnect the trolley and the lance. The counterbalance device may comprise a retractable tethering cable connected to the proximal end of the lance.

Some embodiments will have a frame which includes at least one stabilization assembly for attachment to adjacent support beams in a vicinity of the component to be suction cleaned. The stabilization assembly may comprise a coupling member connectable to the frame, a connecting plate connectable to an adjacent support beam in the vicinity of the component, and a turnbuckle assembly interconnecting the coupling member and the connecting plate.

In use, an apparatus according to the embodiments described herein may be positioned adjacent a component from which particulates are to be removed (e.g., SCR catalyst used in a SCR system), and operating the suction generator to generate a suction at the nozzle of the lance. The lance may be manipulated to move the nozzle across the component to cause particulates to be removed therefrom by the generated suction, following which the removed particulates may be transported from the component through the lance.

As noted previously, the suction may be generated at the nozzle by means of a venturi device which generates a suction in response to a flow of pressurized fluid (air) therethrough. The particulates transported from the component through the lance will therefore be entrained in such fluid flow which can thereafter be directed to a filter assembly. The entrained particulates may thus be removed by suitable filter media in the filter assembly, following which substantially particulate-free fluid (air) may be discharged to the ambient environment.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

An apparatus 10 according to an embodiment of the invention for removing accumulated particulates from an SCR or convection system (schematically represented by reference numeral 12) while the system 12 is operational is depicted the accompanying FIGS. 1-6. As shown, the apparatus 10 generally includes a frame assembly 14 comprised of a pair of spaced-apart vertical supports 16a, 16b having lower ends received within a vertical branch 18a, 20a of the tubular couplings 18, 20, respectively. The frame 14 likewise has pairs of downwardly divergent leg supports 22-1, 22-2 and 24-1, 24-2 having upper ends received within a respective one of the leg branches 18-1, 18-2 and 20-1, 20-2, respectively, of the couplings 18, 20. Base supports 30, 32 span the distance between the lower ends of leg supports 22-1, 24-1 and 22-2, 24-2, respectively. Casters 34 may be mounted to the lower end of each leg support 22-1, 22-2, 24-1 and 24-2 to allow the frame 14 to be maneuvered relative to an opening 12a in the system 12. The upper ends of the vertical supports 16a, 16b carry a mounting pad 36a, 36b to which a gantry beam 38 is attached. The vertical supports 16a, 16b are removably attached to the couplings 18, 20 by means a pin and aperture arrangement 18b, 20b thereby allowing vertical height adjustment of the gantry beam 30 relative to the system opening 12a in the direction of arrow A1.

Figure 1:
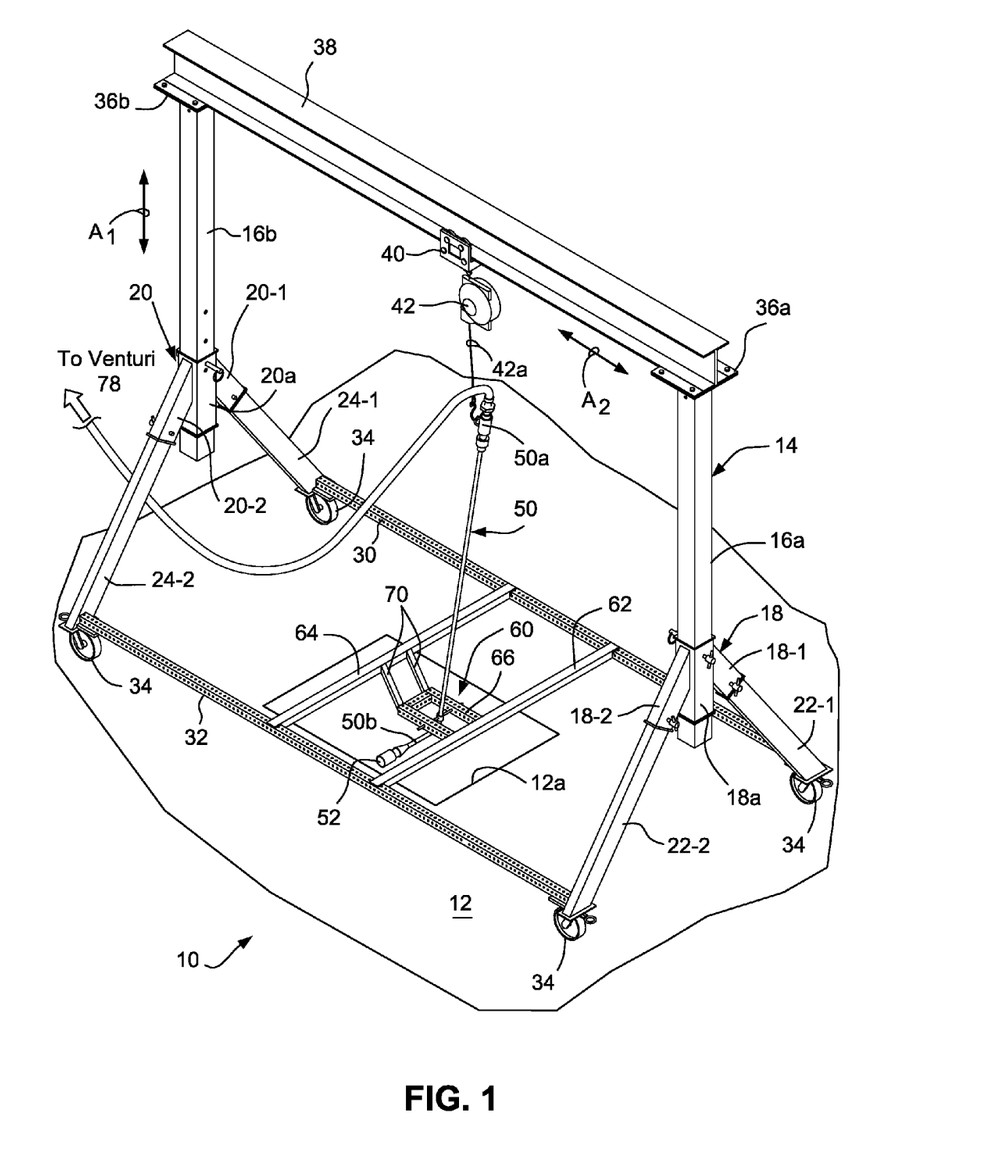
FIG. 1 is a perspective view showing an apparatus according to an embodiment of the invention.
Figure 2:
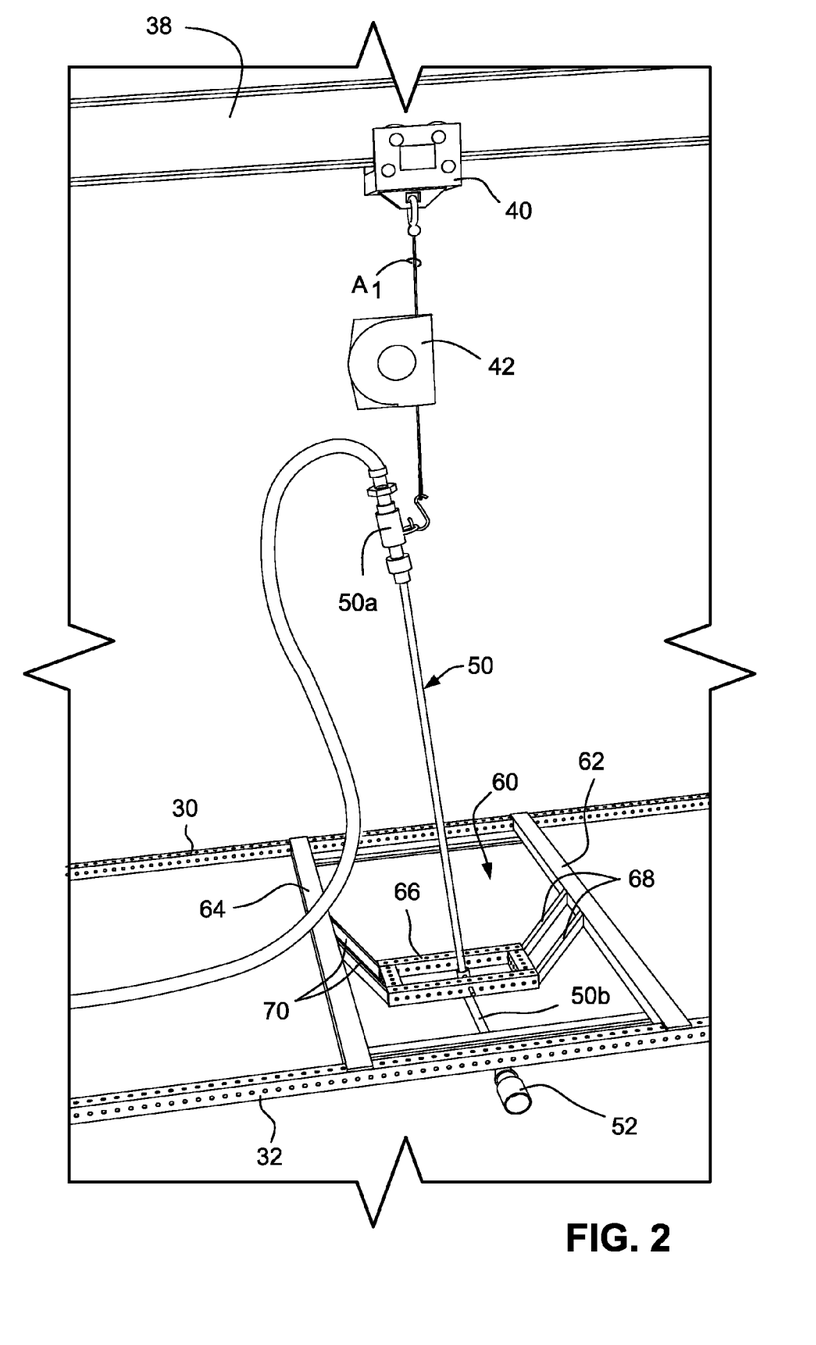
FIG. 2 is an enlarged perspective view of the mounting assembly employed in the apparatus depicted in FIG. 1.
Figure 3:
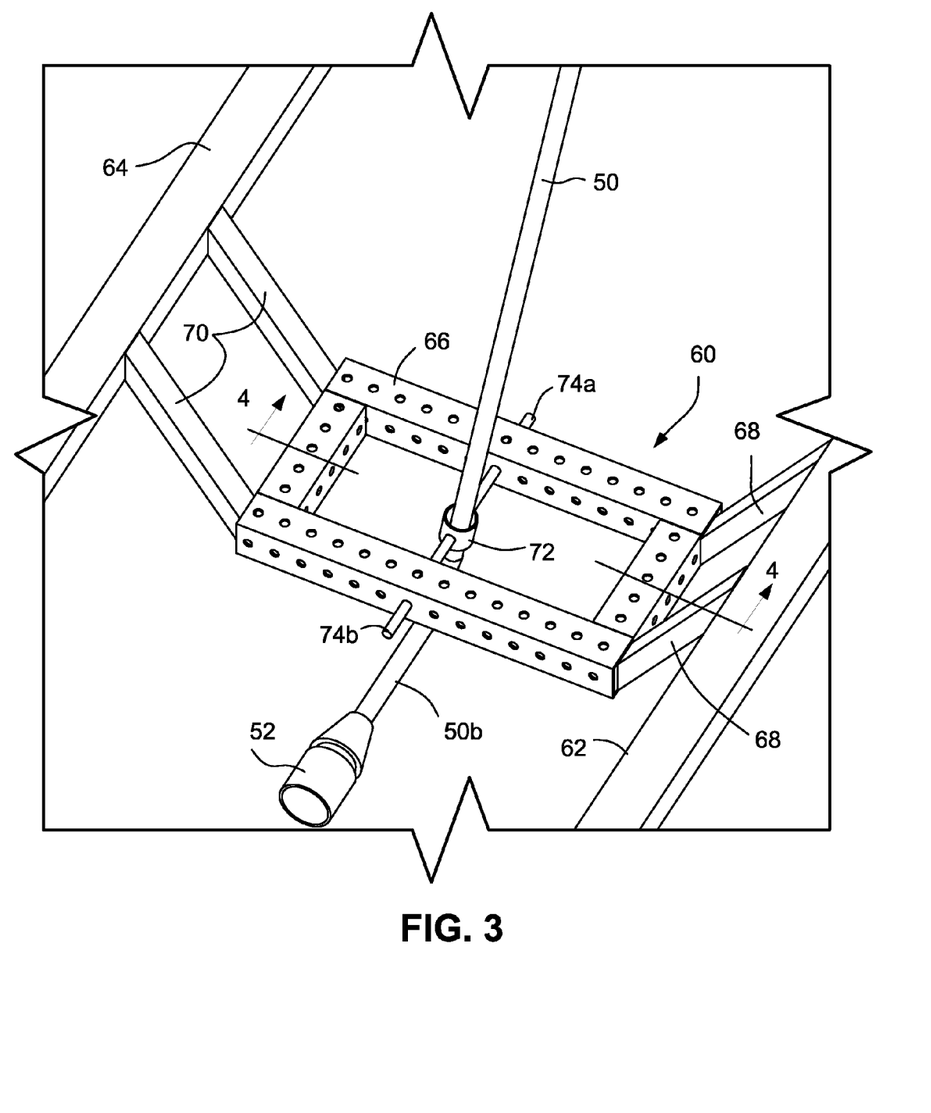
FIG. 3 is an even further enlarged perspective view of the guide collar assembly employed in the mounting assembly depicted in FIG. 2.

A trolley 40 is moveably supported by the gantry beam 38 so as to be capable of reciprocal movements along the gantry beam 38 in the direction of arrow A2. The trolley 40 in turn dependently supports a counterbalance device 42 having a tethering cable 42a attached to a proximal end 50a of a rigid tubular vacuum lance 50. The lance 50 includes a distal end 50b which in the embodiment shown is at substantially a right angle relative to the elongate axis of the lance 50.

The weight of the vacuum lance 50 is therefore counterbalanced by the counterbalance device 42 to allow an operator to insert the lance 50 into and remove it from the system 12 through opening 12a. The counterbalance device 42 thus assists the operator against gravity as the lance 50 and the nozzle 52 attached at its distal end 50b are guided into the system 12 through opening 12a during cleaning by allowing the tethering cable to be retracted and payed-out as the lance is raised and lowered, respectively, relative to the system 12. The nozzle 52 is most preferably a graphite head which is sufficiently soft so as to avoid damage to the relatively delicate material of the SCR catalyst (not shown) in the system 12.

The distal end 50b of the lance 50 is received by a guide collar assembly 60 which is perhaps better viewed by the enlarged depictions thereof in FIGS. 2-6. In this regard, the collar assembly 60 includes a pair of spaced-apart cross-supports 62, 64 extending between and attached to the base supports 30, 32. A rectangular parallelepiped shaped cradle box 66 is dependently supported by and attached between cross-supports 62, 64 by the connecting members 68, 70.

Figure 4:
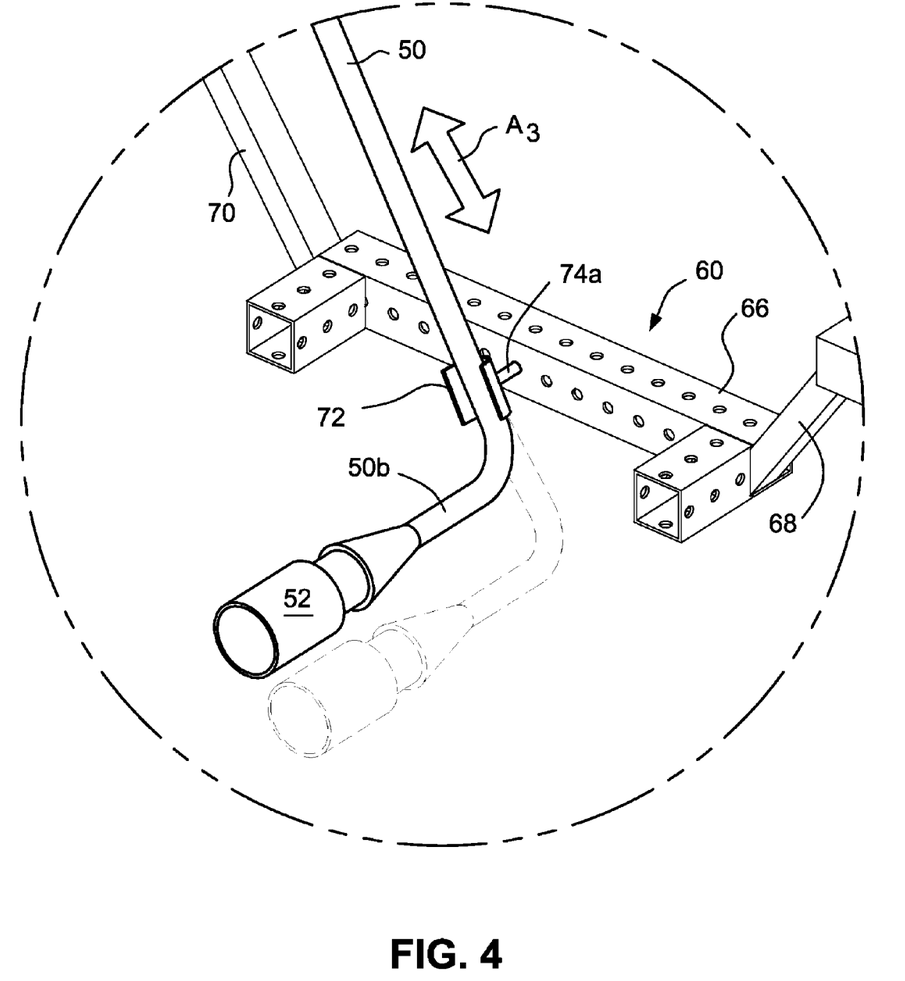
FIG. 4 is a further perspective view partly in section of the guide collar assembly taken along line 4-4 in FIG. 3 and showing longitudinal movement of the vacuum lance permitted thereby.
Figure 5:
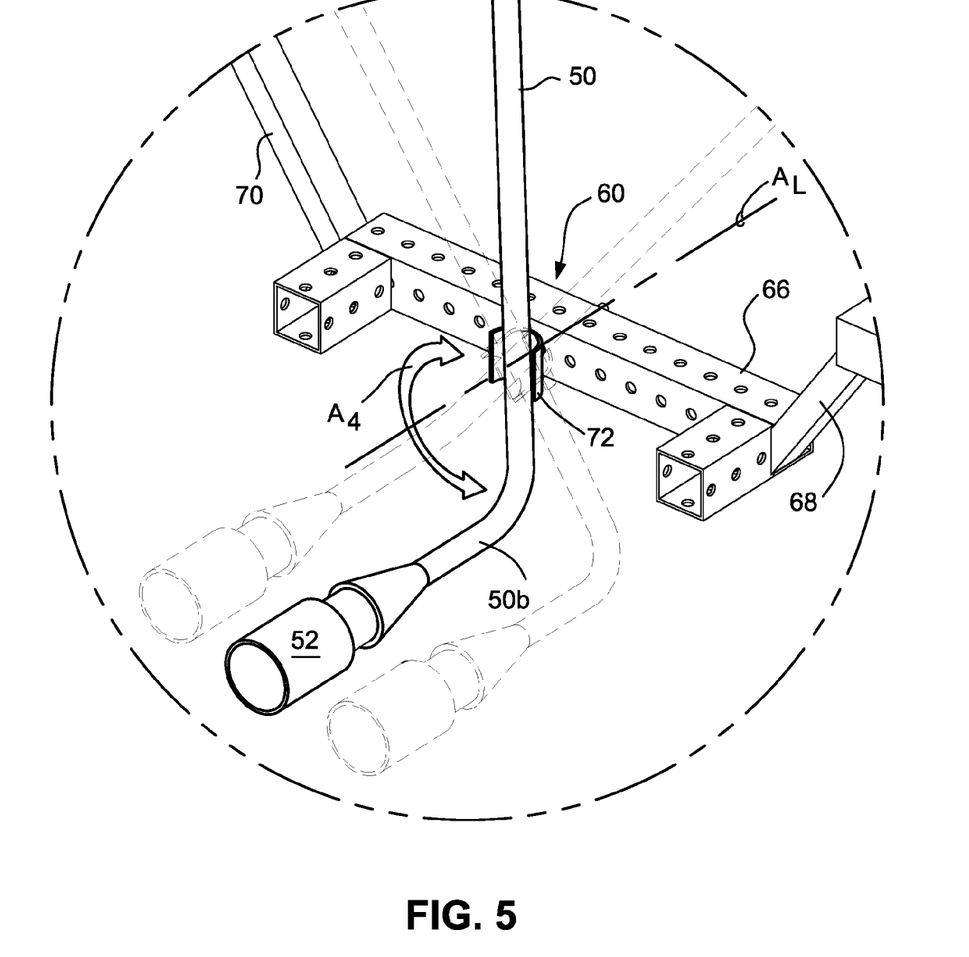
FIG. 5 is a perspective view partly in section of the guide collar assembly similar to FIG. 4 but showing the pivotal movement of the vacuum lance permitted thereby.
Figure 6:
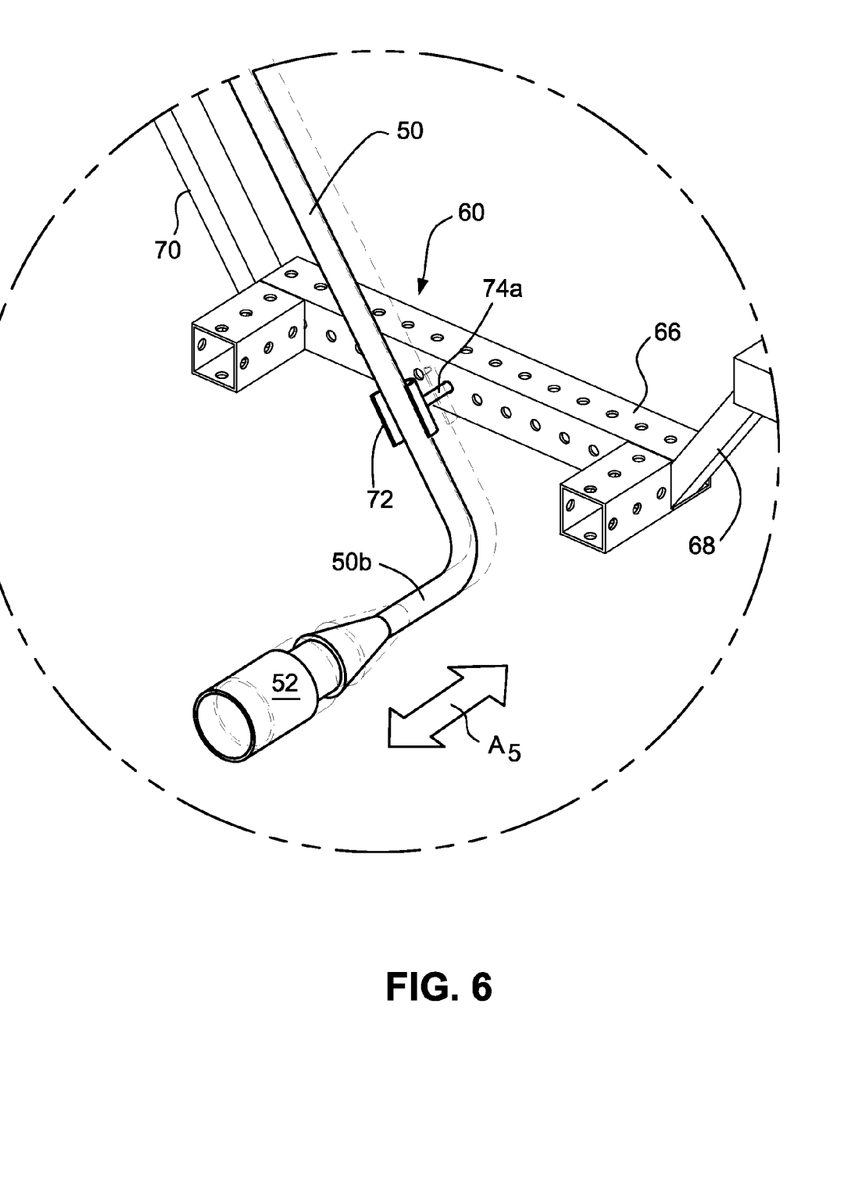
FIG. 6 is a perspective view partly in section of the guide collar assembly similar to FIG. 4 but showing the latitudinal movement of the vacuum lance permitted thereby.

The lance 50 is received within a tubular supporting collar 72 which is pivotally attached to the cradle box 66 by opposed pins 74a, 74b. As is shown in FIGS. 4-6, the collar 72 has several degrees of freedom to allow movement of the lance 50 and the nozzle 52 attached to the distal end 50b thereof relative to the material being cleaned. Specifically, the collar 72 loosely surrounds the lance 50 to allow it to be moved reciprocally upwardly and downwardly in the direction of arrow A3 in FIG. 4. In addition, the lance 50 may be pivoted about the longitudinal axis $A_L$ of the pins 74a, 74b in the direction of arrow A4 as shown by FIG. 5. In addition, the pins 74a, 74b are sufficiently long to allow for back-and-forth movements within the cradle box 66 as shown by arrow AS of FIG. 6. In addition to the movements shown in FIGS. 4-6 by arrows A3-A5, the lance may also be rotated about its longitudinal axis to allow the nozzle 52 to be pivoted back and forth in a generally horizontal plane. Thus, the guide collar assembly 60 allows the lance 50 and the nozzle 52 attached at the distal end thereof to be manipulated and positioned as may be desired by the operator during the vacuum cleaning operation.

Figure 7:
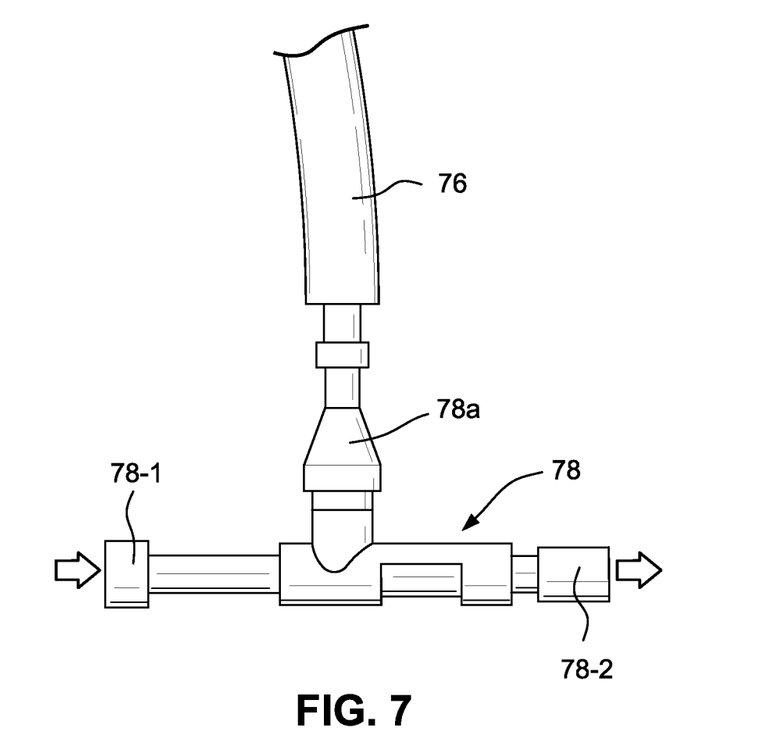
FIG. 7 is view of a venturi effect device that may be used with the apparatus depicted in FIG. 1.

The proximal end 50*b* of the lance 50 is attached via flexible hose 76 (see FIG. 1) to the suction coupling 78*a* of a suction generator which in the embodiment shown is provided by a static venturi device 78 (see FIG. 7). The venturi device 78 produces a reduced pressure (vacuum) in the hose 76 and thus at the nozzle 52 attached at the distal end of the lance 50 by a flow of compressed air entering the venturi device 78 at its inlet end 78-1 and being discharged at its outlet end 78-2. As is well know, this flow of compressed air within the venturi device 78 creates reduced (vacuum) pressure at the suction coupling 78*a*. In this manner, therefore, a suction force is evident at the nozzle 52 attached at the distal end of the lance 50*b* by virtue of the hose 76. Alternatively, other means of generating a suction may be employed, such as dynamic vacuum pumps and the like.

Figure 8:
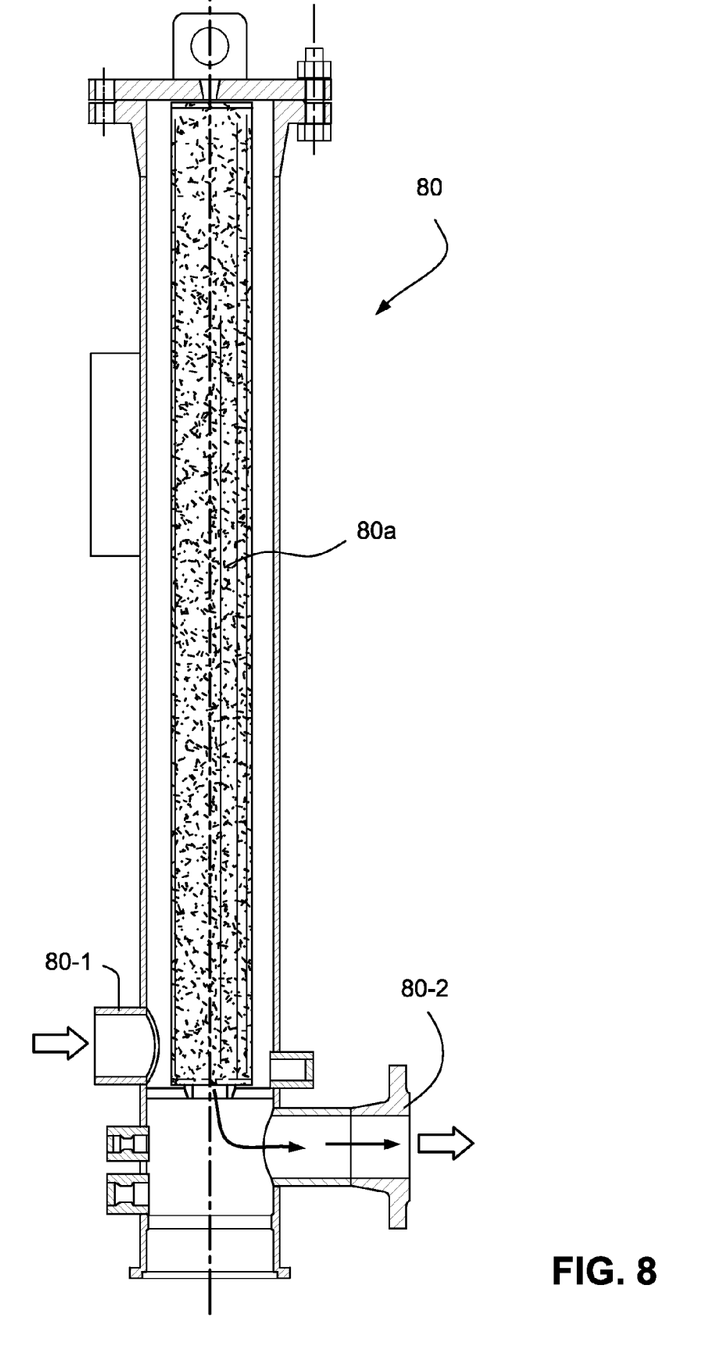
FIG. 8 is a cross-sectional elevational view of a filter assembly that may be used with the apparatus depicted in FIG. 1.

As the nozzle 52 is moved across the SCR catalyst (or other material) within the system 12 as guided manually by an operator (as may be aided by a video camera (not shown) attached at the distal end 50*b* of the lance 50), loose particulates will be suctioned out of the system 12 and travel through the lance 50 and the hose 76 to the venturi device. The loose particulates thereby suctioned from the SCR catalyst material within the system 12 will therefore be entrained by the compressed air flowing through the venturi device 78 and discharged from its outlet end 78-2. The outlet end 78-2 may therefore be connected by suitable hose (not shown) to the inlet end 80-1 of a filter assembly 80 as shown in FIG. 8 so that the entrained particulates may be removed from the air flow through filter media 80*a*. Substantially particulate-free air may therefore be discharged to the ambient environment from the filter assembly 80 through outlet 80-2.

In use, the apparatus 10 is mounted above the furnace system 12 relative to the access opening 12*a* (which may approximately be 8"×24"). The operator will manipulate the lance 50 so that the nozzle 52 is moved across the catalyst to be cleaned associated with the system component. As this happens, the soft graphite head of the nozzle 52 minimizes damage to the component while allowing close contact. The reduced pressure generated at the nozzle 52 sucks accumulated particulates from the component. These liberated particulates then travel along the lance 50 and hose 76 to the venturi device 78 and then into the main airflow through the venturi 78 to the filter media 80*a* enclosed within the filter assembly 80. The filter media 80*a* collects and retains the dislodged particulates while the airflow through the filter 30 continues and is discharged into the ambient atmosphere through outlet 80-2 thereby avoiding atmospheric pollution from the particulates removed from the component.

Figure 9:
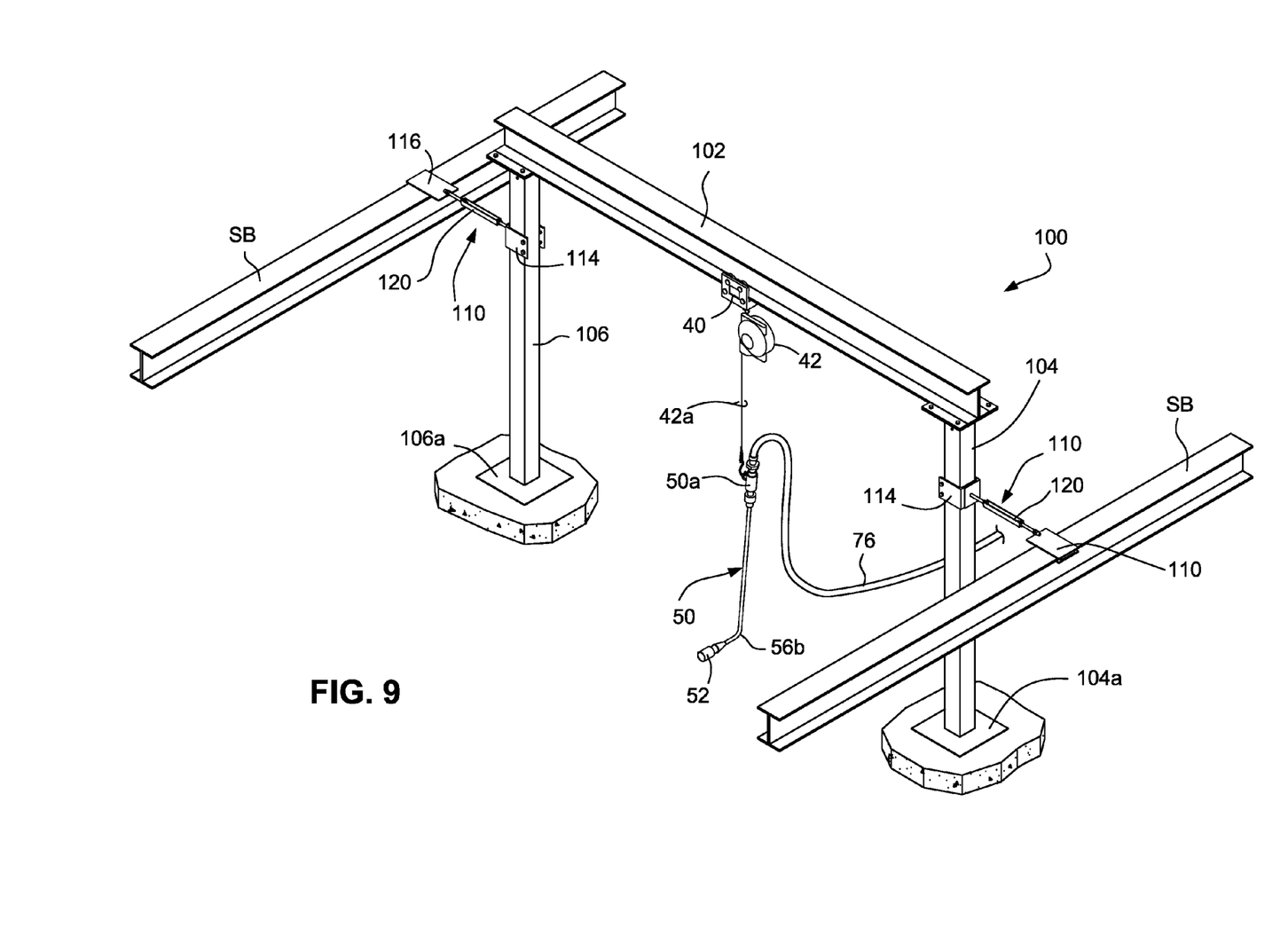
FIG. 9 is a perspective view showing an apparatus according to another embodiment of the invention.
Figure 10:
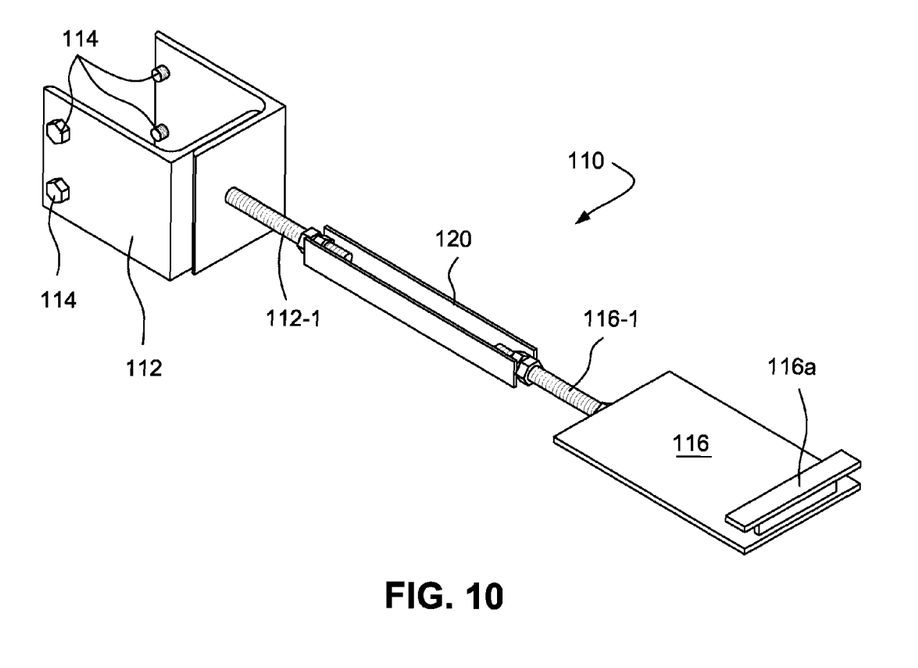
FIG. 10 is a perspective view of a clamping assembly for use with the apparatus depicted in FIG. 9.

Instead of cleaning a catalyst of an SCR system, the apparatus may be used to clean the convection section of a furnace. In this case, the graphite head of the nozzle may be replaced with a metal wire brush, as the heat transfer fins and pipes of the convection section are less prone to damage than the catalyst. While the same gantry and counterbalance can be used, in an alternative embodiment, the lance may be mounted on a balancing fulcrum, with the counterbalance mounted on an elongate rod on an opposing side of the balancing fulcrum. The lance, nozzle, reduced pressure generator, hose, and enclosed filter may be the same as described above. An access hole may be made in the convection section of the furnace to allow the lance and nozzle inside, to allow cleaning An alternative embodiment of an apparatus 100 according to the invention is shown in FIGS. 9 and 10. Specifically, the apparatus 100 will, like apparatus 10 described above include a gantry beam 102 connected to and spanning a pair of upright supports 104, 106. Similarly, the gantry beam 102 will likewise support the trolley 40 which in turn dependently supports the counterbalance device 42 having a tethering cable 42*a* attached to a proximal end 50*a* of the tubular vacuum lance 50. The weight of the vacuum lance 50 is therefore counterbalanced by the counterbalance device 42 to allow an operator to insert the lance 50 into and remove it from the system being vacuum cleaned.

In the embodiment of the apparatus 100 depicted in FIG. 9, the upright supports 104, 106 include foot pads 104*a*, 106*a* which are positioned on a rigid supporting surface of the system being vacuum cleaned. In order to stabilize the gantry beam 102 spanning the upright supports 104, 106, a pair of stabilization assemblies 110 are provided. Each stabilization assembly includes at one end a U-shaped coupling member 112 which is sized and configured to be attached to a respective one of the upright supports 104, 106 by means of retaining bolts 114 (see FIG. 10). A connection plate 116 is provided at an opposite end of the stabilization assembly 110, the plate 116 having a raised lip bar 116*a* so as to engage a flange of an existing structural support beam SB associated with the system being cleaned.

The U-shaped coupling member 112 and the connection plate 116 are respectively provided with threaded shafts 112-1 and 116-1 which are coaxially coupled to one another by a turnbuckle 120. Thus, in thus the U-shaped coupling member 112 will be connected to one of the upright supports 104, 106 and the lip bar 116*a* of the connection plate 116 will be engaged with an edge of an adjacent one of the structural support beams SB. Thereafter, the turnbuckle 120 may be turned so as to drawn the U-shaped coupling member 112 and connection plate 116 toward one another. In such a manner, each stabilization assembly 110 will positively connect the upright supports 104, 106 to an adjacent respective structural support beam SB thereby stabilizing the gantry beam 102.

It will be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. An apparatus for removing accumulated particulates from a component comprising:
   a portable frame;
   a tubular lance supported by the frame and having a nozzle at a distal end thereof;
   a venturi device suction generator having inlet and outlet ends for passage therethrough of a flow of pressurized fluid, and a suction port; and
   a flexible hose connecting a proximal end of the lance to the suction port of the venturi device suction generator, wherein
   manipulation of the lance to move the nozzle across a component allows accumulated particulates to be removed therefrom through the lance.

2. The apparatus according to claim 1, wherein the nozzle is comprised of graphite.

3. The apparatus according to claim 1, wherein the distal end of the lance is at substantially a right angle relative to a longitudinal axis thereof.

4. The apparatus according to claim 1, wherein the frame comprises a guide collar assembly having a tubular supporting collar surrounding the lance.

5. The apparatus according to claim 4, wherein the guide collar assembly comprises a support cradle, and wherein the supporting collar is movably connected to the support cradle by a connection pin.

6. The apparatus according to claim 1, wherein the frame comprises:
a separated pair of upright supports, and
a gantry beam attached to and spanning the upright supports.

7. The apparatus according to claim 6, further comprising:
a trolley movably coupled to the gantry beam; and
a counterbalance device interconnecting the trolley and the lance.

8. The apparatus according to claim 7, wherein the counterbalance device comprises a retractable tethering cable connected to the proximal end of the lance.

9. The apparatus as in claim 1, wherein the frame comprises caster wheels.

10. The apparatus as in claim 1, wherein the frame comprises at least one stabilization assembly for attachment to adjacent support beams in a vicinity of the component.

11. The apparatus as in claim 10, wherein the stabilization assembly comprises a coupling member connectable to the frame, a connecting plate connectable to an adjacent support beam in the vicinity of the component, and a turnbuckle assembly interconnecting the coupling member and the connecting plate.

12. The apparatus as in claim 6, wherein the pair of upright supports are height adjustable.

13. The apparatus according to claim 1, further comprising
a filter assembly having an inlet end fluid-connected to the outlet end of the venturi device and a discharge end, wherein the filter assembly receives a flow of pressurized fluid with entrained particulates from the outlet end of the venturi device and discharges a substantially particulate-free pressurized fluid flow through the discharge end thereof.

14. A method for removal of particulates from a component by suction comprising the steps of:
(a) positioning an apparatus according to claim 1 adjacent a component from which particulates are to be removed;
(b) operating the venturi device suction generator to generate a suction at the nozzle of the lance;
(c) manipulating the lance to move the nozzle across the component to cause particulates to be removed therefrom by the generated suction; and
(d) transporting the removed particulates from the component through the lance.

15. The method according to claim 14, wherein step (d) comprises:
(d1) entraining the particulates in a flow of air,
(d2) directing the flow of air and entrained particulates to a filter assembly,
(d3) removing the entrained particulates from the flow of air within the filter assembly, and
(d4) discharging a substantially particulate-free flow of air from the filter assembly.

16. The method according to claim 14, which comprises suspending the lance by a counterbalance device.

17. The method according to claim 16, wherein the counterbalance device comprises a tethering cable, and wherein the method further comprises attaching a proximal end of the lance to the tethering cable.

18. The method according to claim 16, further comprising providing a gantry beam having a moveable trolley, and dependently supporting the counterbalance device from the trolley.

19. An apparatus for removing accumulated particulates from a component comprising:
a portable frame;
a tubular lance supported by the frame and having a nozzle at a distal end thereof; and
a suction generator operatively connected to a proximal end of the lance to generate a suction at the nozzle, wherein manipulation of the lance to move the nozzle across a component allows accumulated particulates to be removed therefrom through the lance, wherein
the frame comprises a guide collar assembly having a tubular supporting collar surrounding the lance, and wherein
the supporting collar comprises a support cradle and a connection pin for movably connecting the supporting collar to the support cradle.

20. The apparatus according to claim 19, wherein the frame comprises:
a separated pair of upright supports, and
a gantry beam attached to and spanning the upright supports.

21. The apparatus according to claim 20, further comprising:
a trolley movably coupled to the gantry beam; and
a counterbalance device interconnecting the trolley and the lance.

22. The apparatus according to claim 21, wherein the counterbalance device comprises a retractable tethering cable connected to the proximal end of the lance.

23. The apparatus as in claim 19, wherein the frame comprises caster wheels.

24. The apparatus as in claim 19, wherein the frame comprises at least one stabilization assembly for attachment to adjacent support beams in a vicinity of the component.

25. The apparatus as in claim 24, wherein the stabilization assembly comprises a coupling member connectable to the frame, a connecting plate connectable to an adjacent support beam in the vicinity of the component, and a turnbuckle assembly interconnecting the coupling member and the connecting plate.

26. The apparatus as in claim 20, wherein the pair of upright supports are height adjustable.

* * * * *